(12) United States Patent
Lorts

(10) Patent No.: US 6,467,465 B1
(45) Date of Patent: Oct. 22, 2002

(54) THROTTLE BODY FUEL INJECTOR ADAPTER MANIFOLD

(76) Inventor: Anthony R. Lorts, 2384 Cedar Key Dr., Lake Orion, MI (US) 48360

( * ) Notice: Subject to any disclaimer, the term of this patent is extended or adjusted under 35 U.S.C. 154(b) by 0 days.

(21) Appl. No.: 09/757,934

(22) Filed: Jan. 10, 2001

(51) Int. Cl.[7] .......................... F02B 43/00; F02M 37/04
(52) U.S. Cl. .................. 123/527; 123/472; 123/470; 123/575
(58) Field of Search ................. 123/470, 472, 123/339.1, 471, 525, 527, 575

(56) References Cited

U.S. PATENT DOCUMENTS

| | | | | |
|---|---|---|---|---|
| 3,789,820 A | * | 2/1974 | Douglas et al. | 123/525 |
| 4,159,703 A | * | 7/1979 | Mayer | 123/472 |
| 4,289,104 A | * | 9/1981 | Takada et al. | 123/472 |
| 4,354,470 A | * | 10/1982 | Miyaki et al. | 123/472 |
| 4,373,493 A | * | 2/1983 | Welsh | 123/525 |
| 4,524,743 A | * | 6/1985 | Mcauliffe | 123/472 |
| 4,556,037 A | * | 12/1985 | Wisdon | 123/472 |
| 4,584,981 A | * | 4/1986 | Tanabe et al. | 123/472 |
| 4,878,475 A | * | 11/1989 | Birsa | 123/525 |
| 5,150,691 A | * | 9/1992 | Imajo | 123/472 |
| 5,237,981 A | * | 8/1993 | Polletta | 123/527 |
| 5,293,856 A | * | 3/1994 | Press et al. | 123/472 |
| 5,809,972 A | * | 9/1998 | Grant | 123/472 |
| 5,881,701 A | * | 3/1999 | King et al. | 123/527 |
| 5,887,574 A | * | 3/1999 | Smith | 123/527 |
| 6,250,261 B1 | * | 6/2001 | Santarossa | 123/27 GE |

* cited by examiner

Primary Examiner—Thomas N. Moulis

(57) ABSTRACT

A means for positioning one or more bottom fed-side ejecting fuel injectors at the inlet of an internal combustion engine, attachable to the air inlet duct or air cleaner assembly, with connected tubes that carry fuel ejected from the injectors through one or more holes in said air cleaner or inlet ducting to optimal points proximate to the engine inlet.

3 Claims, 3 Drawing Sheets

THROTTLE BODY FUEL INJECTOR ADAPTER MANIFOLD

BACKGROUND

1. Field of the Invention

This invention relates to an improved means of mounting bottom fed, side ejecting fuel injectors (like the gaseous type presently made by Servo-Jet of San Diego, Calif.) to the air inlet of an internal combustion engine.

2. Prior Art

The predominate means of adapting gasoline and diesel engines to operate on gaseous fuels has been through the utilization of gaseous carburetors or mixers placed upstream of the liquid fuel induction systems. Gas carburetors have offered the advantage of allowing a wide variety of liquid fueled engines to be operated on gaseous fuels with a minimum amount of labor and re-calibration. This conversion method has the benefit of being relatively simple to install, but fails to deliver the precise fuel delivery offered by digitally controlled fuel injection. The development of digital engine controls for gasoline engines has led to their adaptation to gaseous fuels such as natural gas and propane, which offer improved potential for reducing undesirable exhaust emissions. Methods of adapting gaseous fuel injectors to internal combustion engines have included the employment of cumbersome mixing devices for diffusing fuel ejected from gaseous injectors into the incoming air upstream of a throttle body, or adapters installed beneath the throttle body as well as individual port fuel injection. This task has been complicated by the necessity of employing relatively high fuel pressures for gaseous fuel injection in comparison to the lower pressure of gasoline systems, which has led to the use of bottom fed-side ejecting solenoid valves with their associated awkward feed and delivery conduits.

SUMMARY OF THE INVENTION

The present invention consists of a fuel injector fuel supply manifold that positions one or more bottom fed- side ejecting gaseous fuel injectors upstream of the inlet of an engine so as to direct fuel ejected from the injectors through sections of tubing to optimal points near the engine inlet. One or more injectors mounted to this supply manifold may be dedicated to metering fuel through a length of tube into the idle air control (IAC) valve circuit of a throttle body at idle power.

Objects and Advantages

The prime object and advantage of the present invention is to provide the simplest and most economical means of adapting gaseous fuel injection to a gasoline or diesel engine while offering an easier installation method than the previous carburetor and injector conversion technologies. Another object and advantage of this invention is to provide a simple means of adding dual or bi-fuel capability to an engine in a way that facilitates rapid switching between either gaseous or liquid fuel, through the employment of two sets of electrically controlled fuel injectors.

An advantage of the present invention is that by placing the injectors upstream of the engine inlet as opposed to placing them in close proximity to the cylinder heads, as with port injection, they are insulated from the heat of the engine and cooled by the incoming air charge. By maintaining the injectors and gaseous fuel at the same temperature as the incoming air, the need to compensate the quantity of the injected fuel for heat induced changes in mass is greatly reduced or eliminated. A fourth object and advantage of this invention is to provide a means of injecting fuel into an engine throttle body or inlet duct that will cool and enhance the flow of accompanying air, thereby increasing the power and efficiency of the engine. A fifth objective is to provide a means of utilizing one or more fuel injectors of optimal size to inject fuel into the idle air control throttle bypass circuitry of a throttle body in order to reduce noise and improve engine idle quality through increased fuel/air homogeneity and lengthened fuel injector pulse width. The means of accomplishing these objects with their accompanying advantages will be apparent from the following description and drawing.

DRAWINGS

REFERENCE NUMERALS FOR FIG. 1

Figure 1:
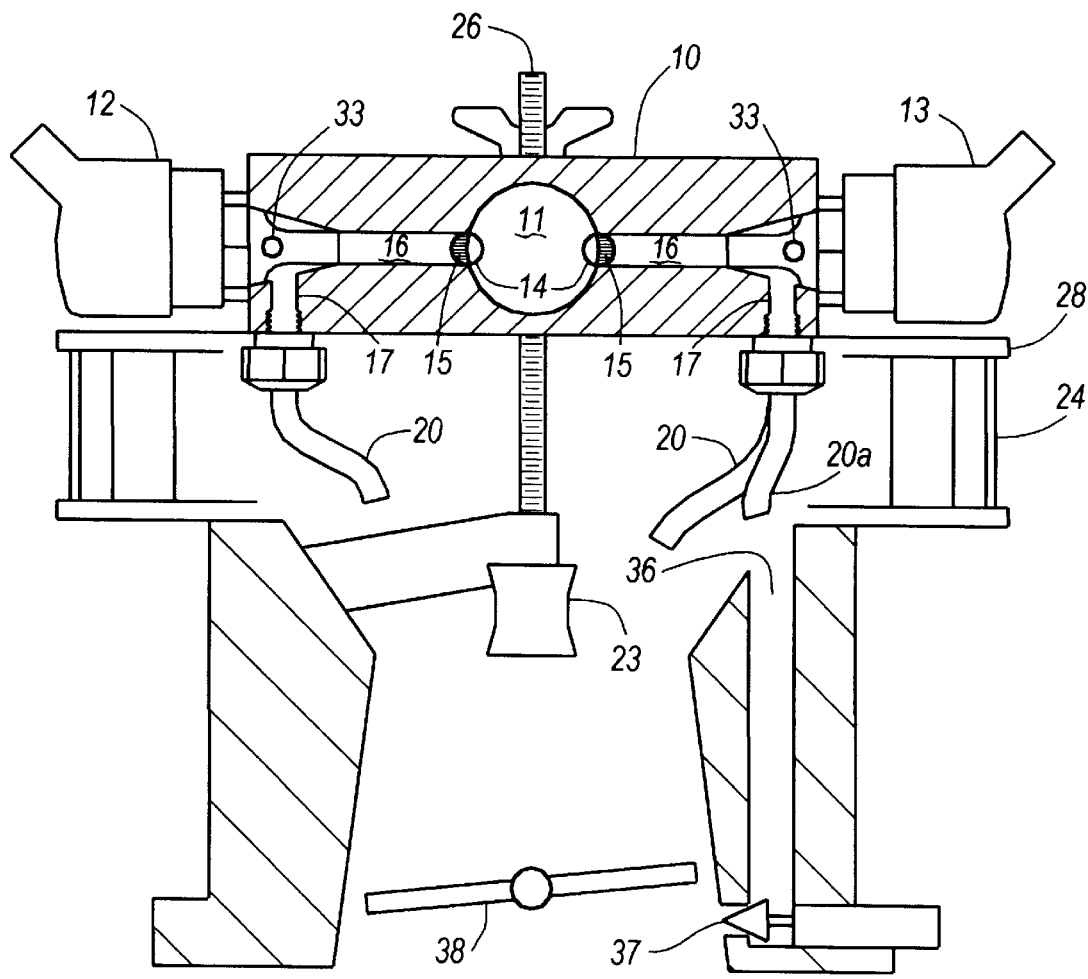
FIG. 1 is a cross-sectional side view of the adapter invention mounted directly over a downdraft gasoline throttle body fuel injection assembly with a throttle bypassing idle air conduit.

10 manifold block
11 annular bore communicating with fuel supply rail conduits
12 bottom fed- side ejecting fuel injectors
13 idle fuel injector
14 fuel injector fuel supply rail conduit
15 annular overlapping area between bore 11 and conduits 14
16 injector fuel feed conduits
17 ejected fuel outlet conduit
18 throttle body
19 annular space surrounding fuel injector ejection ports 33
20 tubes for directing fuel from injectors to engine inlet
20a tube for directing fuel to inlet of throttle bypass air conduit
22 tube compression fittings
23 gasoline throttle body fuel injector
24 air cleaner assembly
26 hold down stud attached to throttle body injector mounting stalk
27 gasoline fuel injector mounting stalk
28 top cover of air cleaner 24
29 fuel injector locating bore
33 fuel injector ejection ports
36 throttle bypass idle air conduit
37 idle air control (IAC) valve
38 throttle valve

REFERENCE NUMERALS FOR FIG. 2

Figure 2:
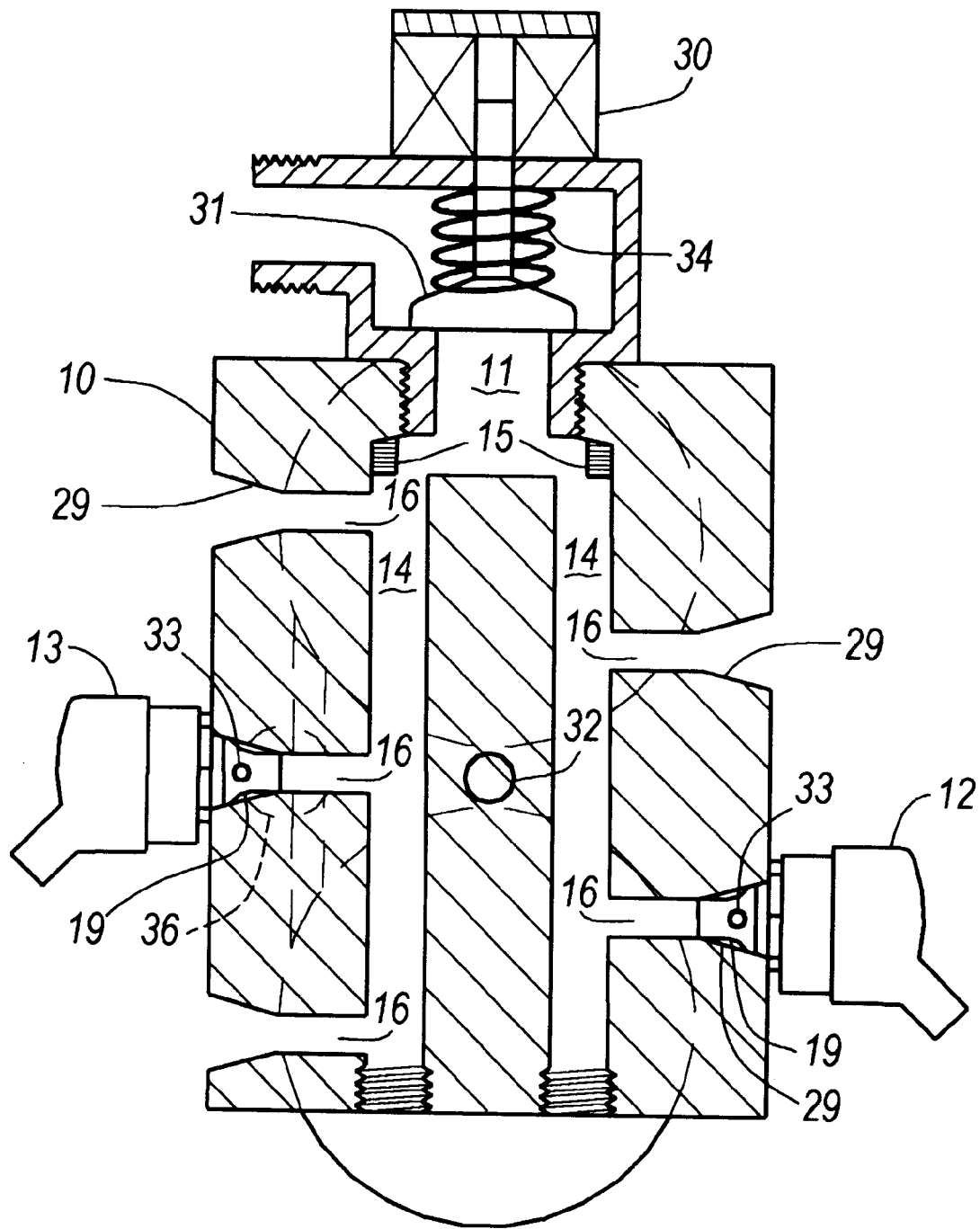
FIG. 2 is a cross-sectional top view of the present invention superimposed over a two barrel throttle body having a throttle bypassing idle air circuit inlet depicted in dashed lines between the two throttle bores.
Figure 2A:
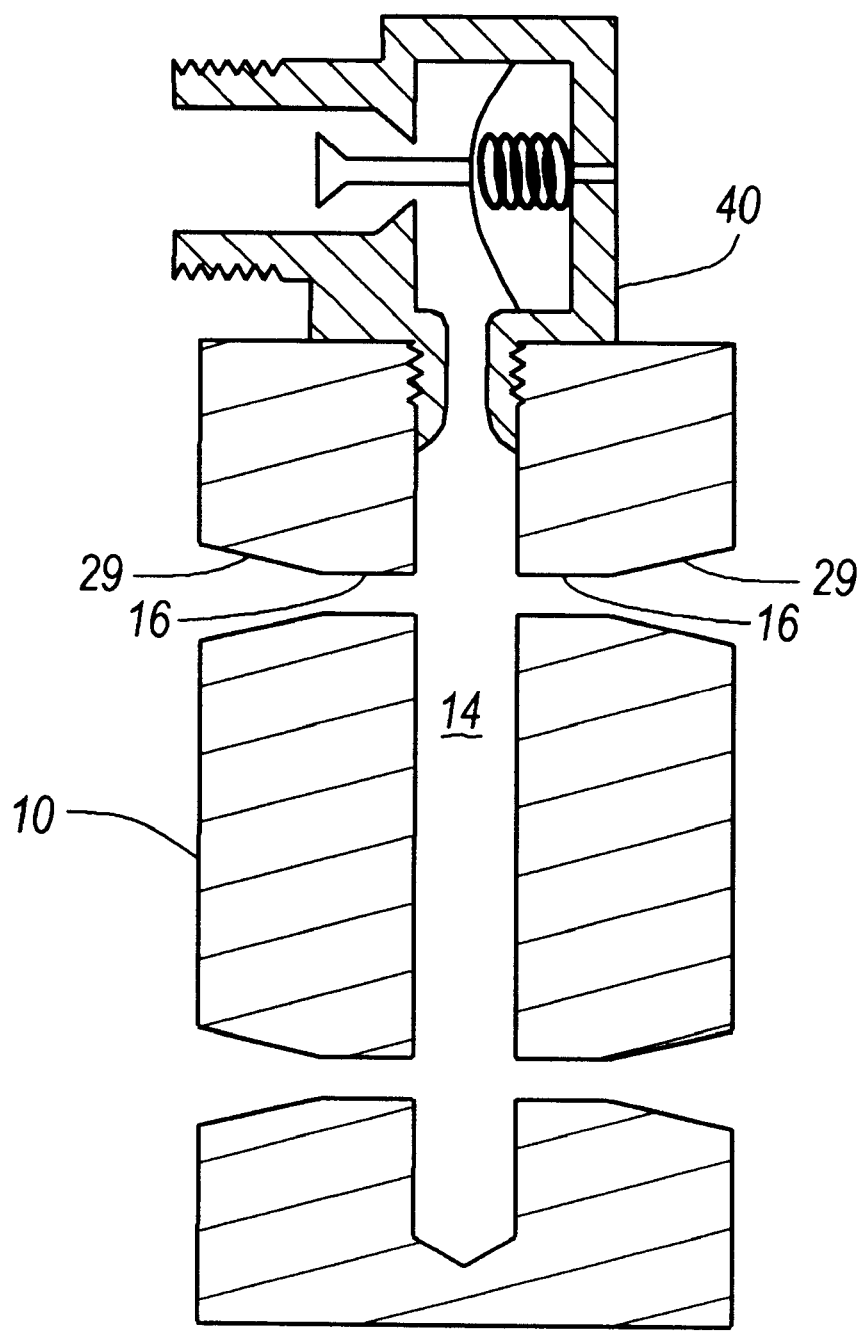
FIG. 2a is a cross-sectional top view of an alternative configuration of the present invention.

11 annular bore communicating with fuel rail conduits
12 bottom fed fuel injector
13 idle fuel injector
14 fuel supply rail conduit
15 annular overlapping area between bore 11 and conduits 14
16 fuel injector feed conduits
18 throttle body
19 annular space surrounding fuel injector ejection ports 29 injector locating bores
30 fuel shut off solenoid valve assembly
31 poppet valve within fuel shut off assembly
32 hole in manifold block for hold down stud
33 fuel injector ejection ports
34 poppet valve return spring
36 dashed lines delineating throttle bypass conduit and throttle body bores beneath manifold block
40 fuel pressure regulator (FIG. 2a only)

DETAILED DESCRIPTION

FIGS. 1 and 2 respectively show side and top views of the invention, which in the present iteration consists of a rectangular piece of aluminum block 10 that is drilled and tapped with a plurality of threaded bores 29 that contain bottom fed- side ejecting gaseous fuel injectors 12 (of the type currently manufactured by Servo-jet products of San Diego, Calif.) Block 10 is formed with internal fuel feed and exit conduits for injectors 12 and thus serves as a compact manifold, and henceforth will be referred to as a manifold block. Referencing FIG. 1 manifold block 10 is seen attached to the top of an air filter assembly 24 via a wing nut and stud 26, which is connected to an engine throttle body 18. Throttle body 18 has a gasoline injector 23 mounted above a typical butterfly throttle plate 38. Stud 26 is found on most throttle body and carburetor assemblies in order to secure either an air filter or air ducting to the inlet, and here secures both block 10 and air filter 24 to the inlet of throttle body 18. By installing a stud of sufficient length, the present invention is readily attachable to either.

As seen in FIG. 2, manifold block 10 is configured to accommodate two opposing rows of one or more gaseous fuel injectors 12. In order to accommodate a centrally located hole at 32 for hold down stud 26, two separate fuel supply conduits 14, serving as fuel rails for each bank of injector valves are located on either side of hole 32. Having a separate supply rail for each row of injectors allows a centrally located hold down stud to apply a uniform clamping force. A separate fuel rail for each row of injectors also allows the use of smaller bore rail conduits to minimize the thickness of the manifold block and eliminates any possible interference between the two rows of injectors caused by rail pressure waves. Supply rails 14 are fed by a communicating annular bore 11, formed between the two rails at the uppermost end of manifold block 10. Annular bore 11 is sized to a sufficient depth and width so as to overlap midway into the ends of the bores of rail conduits 14 at the annular recessed areas 15, to allow free communication and unrestricted fuel flow. The inlet of bore 11 may be threaded to allow attachment of a closeable solenoid operated shut off valve assembly 30, or a pressure regulator 40 as depicted in FIG. 2a.

Fuel rails 14 communicate with perpendicular conduits 16 which feed fuel to the inlets of injector valves 12. As depicted in FIG. 2a which shows an alternative configuration of the preferred embodiment, a single fuel supply rail conduit 14 may be employed to feed opposing rows of injectors where either injector timing or the size and shape of the single rail mitigate against the possibility of interfering rail pulsations, or the securing of the manifold block with a centrally located stud is unnecessary. Placing a pressure reducing regulator at the inlet of conduit 14 as opposed to placing it further upstream reduces the volume of gas between the output side of the regulator and the inlet of the injectors resulting in reduced lag and improved response of the regulator to transient variations of injector fuel flow.

Referencing FIGS. 1 and 2, it can be seen that the side ejection ports 33 of injectors 12 are positioned so that they eject fuel into an annular space 19, formed between injector holding bores 29 and injectors 12. Two O-rings attached to the injectors seal the top and bottom of annular spaces 19. Referencing FIG. 1, annular spaces 19 communicate with perpendicularly drilled conduits 17, which direct fuel ejected from the injectors downward toward the inlet of throttle body 18. Each conduit 17 terminates at the bottom surface of manifold block 10 in a threaded hole which accepts a compression fitting 22. Compression fittings 22 each hold a length of malleable tubing 20 typically made of copper. Tubes 20 deliver fuel downward in the present embodiment and eject it at optimum points proximate to the inlet of throttle body 18.

Manifold block 10 may be of sufficient length and width to accommodate one or more injectors dedicated to supplying fuel to the engine exclusively at idle speed. In FIGS. 1 and 2, an injector 13 is positioned to meter fuel into the inlet of a throttle bypassing air conduit 36. Referencing FIG. 1, it will be seen that idle injector 13 delivers fuel to bypass conduit 36 via tube section 20a. As is the present practice, throttle body 18 contains an electronically controlled, variably closeable idle air control (IAC) valve assembly 37 which controls idle speed by regulating engine inlet air flow through throttle bypass conduit 36 when throttle 38 is closed.

The top 28 of air filter assemble 24 is adapted to accept manifold block 10 by cutting one or more holes in it to accommodate all compression fittings 22 and tubes 20 and 20a. The perimeter of manifold block 10 obviously must overlap all holes cut in the top of the air cleaner or inlet ducting sufficiently enough to prevent the entrance of unfiltered air. A sealant such as rtv silicone may be employed to seal manifold block 10 to the air cleaner or inlet ducting. Another form of the present invention may have the air filter top or inlet ducting cast, molded or machined together with the manifold block to form one piece. In the present embodiment, alignment of the invention relative to the bore or bores of throttle body 18 is maintained by bending tubes 20 so that they contact the throttle bores or fuel injector mounting stalks of the throttle body. Alignment of the invention may also be accomplished by keying the manifold block to the air cleaner, and the air cleaner to the throttle body, or by replacing the throttle body or carburetor mounting bolts with elongated studs that pass through aligning holes in manifold block 10 and thus act as locating dowels.

Operation of the Invention

In a bi-fueled application that utilizes either gasoline or a gaseous fuel, both gaseous injectors 12 and gasoline injectors 23 may have their controlling ground wires connected together in parallel through the engine control unit. The desired fuel with its respective injectors may then be selected by completing the positive side of its circuit, leaving the circuit of the unused injectors open. With reference to FIG. 2, it can be seen that when the operator chooses to operate an engine equipped with the present invention on a fuel that utilizes injector valves 12, a voltage applied to solenoid shut off valve 30, will cause its enclosed poppet valve 31 to open against a spring 34, allowing fuel to flow into annular bore 11 and supply rail conduits 14. Referencing FIG. 1, fuel injectors 12 controlled by typical pulse width modulated digital engine control means, meter fuel into conduits 17 and tubes 20 which serve to direct the fuel to optimal points proximate to the entrance of throttle body 18. The length and shape of tubes 20 may be varied to give optimal mixture flow and distribution. Longer tubes extending into the engine inlet may be coupled to injectors that operate primarily at reduced engine loads and speeds while shorter tubes terminating outside and above the engine inlet may communicate with injectors that operate at higher power settings.

The utilization of a typical throttle bypassing idle air control circuit may deprive tubes 20 of the airflow necessary for gaseous fuel entrainment. In order to compensate for insufficient fuel entrainment because of minimal airflow through the throttle body bores at idle, fuel may be injected directly into bypassing idle air conduit 36. Referencing FIG. 1 and FIG. 2, an injector 13 is located above conduit 36 which operates in lieu of the other injectors at idle to deliver fuel to the inlet of throttle bypass conduit 36 via tube 20a when the throttle is closed. This feature insures an uninterrupted supply of homogeneous fuel-air mix at idle when virtually all air consumed by the engine bypasses tubes 20, entering the engine through the idle air circuit. As seen in FIG. 1 variably closeable idle air control (IAC) valve 37 regulates engine speed at idle with throttle 38 closed by controlling the flow of the air-fuel mixture through conduit 36 and into the engine beneath throttle valve 38 in the typical manner. Control of the switching between main injectors 12 and idle injector 13 may be by a throttle position sensor connected to an injector driving engine control computer.

In addition to providing improved closed throttle mixture homogeneity, replacing multiple injectors operating at short pulse widths with a single injector feeding fuel directly into an idle bypass circuit, operating at longer pulse widths, acts to reduce noise and facilitate smoother idling by improving fuel control. This is especially important at high fuel pressures where minimum pulse widths can cause idle instability. This feature is unnecessary on throttled engines employing such means such as stepper motors or fast idle cams to control idle speed by varying the opening of the throttle valves, instead of IAC valve regulated air circuits.

I claim:

1. Means for mounting one or more bottom fed, side ejecting gaseous solenoid fuel injectors to the air inlet or throttle body of an engine, whereby a simple method of adding digitally controlled gaseous fuel metering is relatively easily accomplished, comprising:

(a) a rigid, rectangular shaped fuel injector supply manifold attachable to the air cleaner or inlet ducting of an engine which contains one or more threaded holes for mounting each injector and a plurality of conduits in communication with said injectors for supplying, metering and transferring fuel to (b) one or more tubes, each communicating with the ejection port of a fuel injector and extending through said air cleaner or inlet ducting to a point in the inlet air flow where fuel is ejected in a manner which achieves optimum fuel-air mixing and flow rate, including (c) one or more said tubes communicating with an injector dedicated to directing fuel to the inlet of a throttle valve bypassing air conduit for the purpose of metering fuel to an engine when the throttle is closed.

2. The fuel injector adapting means of claim 1 wherein said fuel injector supply manifold further includes a solenoid operated fuel shutoff valve or a fuel pressure regulator attached to the fuel inlet.

3. The fuel injector adapting means of claim 1 wherein the said fuel injector supply manifold is formed integrally with said engine air cleaner or inlet ducting.

* * * * *